United States Patent Office 2,770,709
Patented Nov. 13, 1956

2,770,709

ELECTRIC FLASH-BUTT-WELDING MACHINES

Charles D. Moore, Byfield, and Hermann W. Stieglitz, Marblehead, Mass., assignors to Thomson Electric Welder Company, Lynn, Mass., a corporation of Massachusetts Application May 25, 1954, Serial No. 432,124

33 Claims. (Cl. 219—97)

This invention relates to electric flash-butt-welding and more particularly to a novel welder adapted automatically to preheat the work to be welded to a flashing temperature and then to complete the weld.

Preheating of work to be welded before the flash welding cycle is carried out has been known to be desirable and sometimes essential, particularly when certain alloys such as leaded brass must be welded, since it largely eliminates sharp temperature gradients in the weld area, resulting in welds of better grain formation and increased ductility in the weld area as well as allowing the use of lower flashing currents and voltages with a resultant reduction in craters in the finished weld.

Even with metals which can be satisfactorily welded without the use of preheating, it has great advantages in reducing electrical demand on the machine. This is true of practically all metals and alloys, both ferrous and non-ferrous, but is of particular advantage in the welding of non-ferrous metals and alloys, such as copper, which have a very high electrical demand; in fact with some copper alloys, machine capacity in terms of cross-sectional area has been doubled by use of preheating techniques, and the heretofore required electrical demand has been cut in half.

Furthermore, the use of preheating greatly reduces the upset force required to produce satisfactory welds. For example, on most of the low and medium alloy steels, reductions in required upset force of over 50% are possible, while on most of the non-ferrous alloys, reductions of 20% to 40% are usually achieved. Such reduction in required upset force enables the use of a lighter welding machine for a given job, or conversely, makes it possible to do heavier welding on a given machine.

Other advantages in the use of preheat are the saving in material achieved by reducing the amount of material consuming flash-off required to bring the material to welding temperature, and the increase in productive capacity of the welding machine achieved by the reduction in the overall time of the welding cycle.

Accordingly, it is an object of the present invention to provide a fully automatic electric flash welder which not only preheats the work to be welded, but also initiates the flashing cycle when a desired preheat temperature is reached.

It is a further object of the invention to provide a welding machine in which the force of the work during preheat may be adjusted independently of the main welding force to prevent premature upsetting or welding and yet is automatically changed to a higher force to allow the use of optimum welding forces on the work during the welding itself.

It is a still further object of the invention to provide a welding machine in which the preheat current may be adjusted independently of the main welding current and which will automatically shift from preheat current to main current to provide an optimum current to suit each condition.

It is a still further object of this invention to provide automatic hesitation of the platen motion if the work to be welded stalls or butts after flashing has been initiated, with automatic resumption of platen motion after the work blows clear.

It is a still further object of the invention to provide a welding machine in which a post heat current may be provided after welding, with the welding current being automatically shifted to a reduced current for post heating at an adjustable predetermined time after the workpieces have been butted to weld them.

As a feature of the invention, novel control circuits are provided which control the automatic operation of the welding machine by means of the voltage drop across the work itself while it is being welded, as well as by the position of the work carrying movable platen.

As a further feature of the invention, a welding machine has been provided in which the workpieces need not have smooth matching opposed end surfaces and need not be carefully gapped, thus eliminating preliminary preparation of the workpieces for welding, as well as the necessity for careful gapping of the workpieces on the welding machines.

Further objects and features of the invention will become apparent from the following description of a preferred embodiment thereof, together with the accompanying drawings in which.

Figure 1:
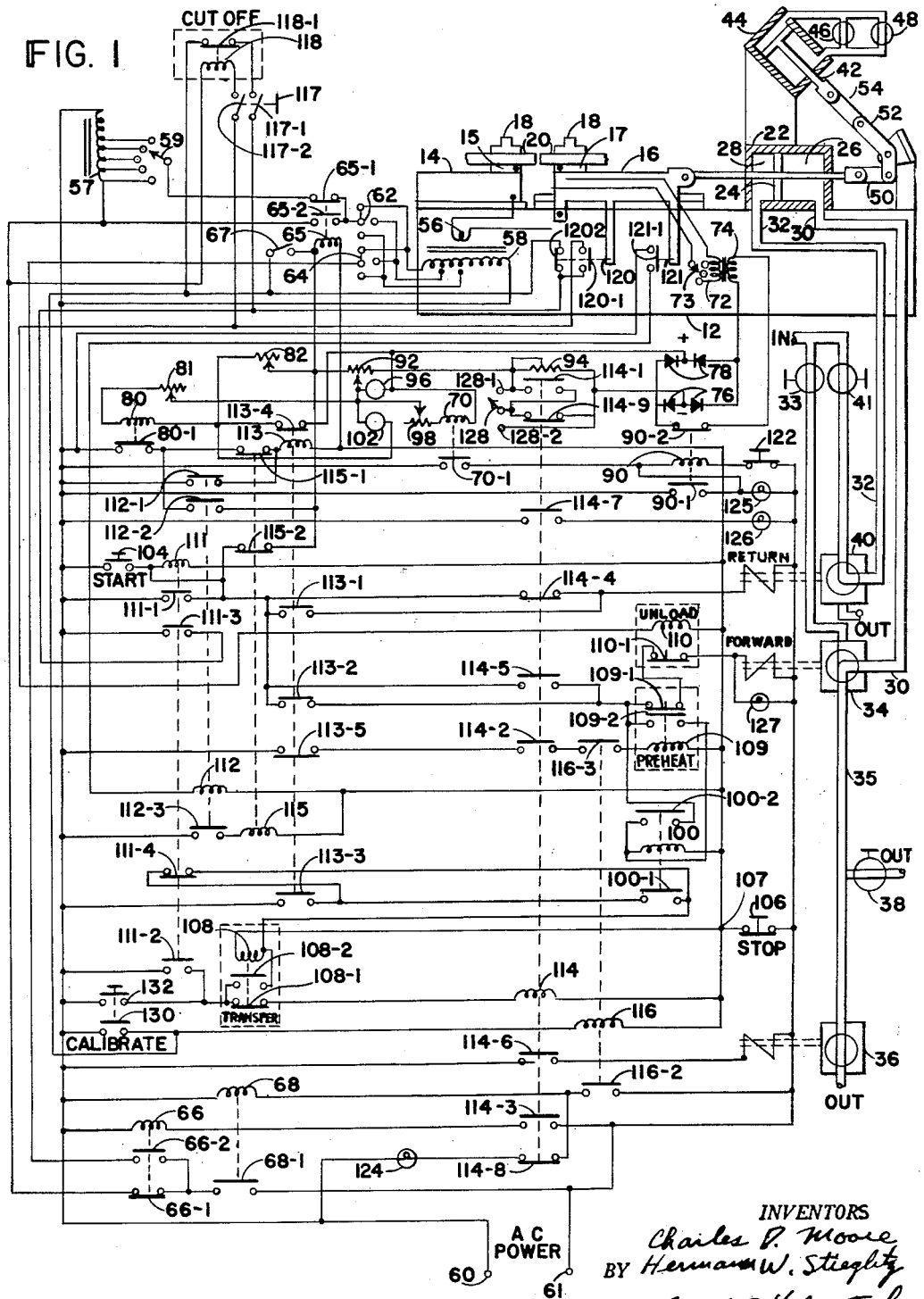
Fig. 1 is a schematic drawing of a welding machine of my invention.

Referring to Fig. 1, the automatic welding machine of the invention has a base 12 upon which are mounted an insulated fixed platen 14 and a movable platen 16, each of such platens having work holding blocks 15 and 17, together with suitable clamps 18 for clamping the pieces of work 20 to be welded.

The movable platen 16 is moved by a hydraulic or other fluid motor mechanism adapted to provide a controlled (relatively slow) movement during the preheating and the flash-off period, followed by a rapid movement to bring the workpieces 20 abruptly together to upset the work by a relatively quick pushup, and includes a main hydraulic cylinder 22 with a piston 24 connected both to movable platen 16 and to a snubbing mechanism hereinafter more fully described. The piston 24, together with cylinder 22, forms a pair of chambers 26 and 28 on each side of the piston, the chamber 26 on the rear side of piston 24 having a pipe 30 connected to said chamber for admitting hydraulic fluid thereto to move platen 16 forward, and the chamber 28 on the forward side of said piston having a similar pipe 32 for admitting fluid thereto. Fluid is admitted to or exhausted from said chambers by means of suitable solenoid operated hydraulic valves 34 and 40, valve 34 providing for forward movement of platen 16 and being connected in its energized position to a suitable source of hydraulic fluid (not shown) through its regulator 33 to admit fluid under pressure to pipe 30 and chamber 26, and in its other position being connected to exhaust. Preferably, the exhaust of forward valve 34 is connected through pipe 35 to return speed by-pass valve 36 which is connected in the normal position to directly exhaust and in its other position is closed, thus forcing the fluid to exhaust through a return speed throttle valve 38 which permits adjustment of the return speed under certain conditions as hereinafter more fully explained.

Chamber 28 of hydraulic cylinder 22 is connected through pipe 32 to solenoid valve 40 which provides for rearward movement of platen 16 by connecting it in its normal or de-energized position to a suitable source of hydraulic pressure (not shown) through its regulator 41 and in its other position connecting chamber 28 to exhaust. Regulators 33 and 41 are adjusted to provide a preheat force or pressure which may be independently adjusted to a force less than the main welding force or pressure, the preheat force being low enough to prevent upsetting or welding during preheating, the main welding force being determined by the characteristics of the metal being welded, which force normally is substantially higher than the permissible pre-heat force.

The snubbing mechanism for controlling the rate of forward movement of movable platen 16 is fully shown and described in Stieglitz U. S. Patent No. 2,492,200, and includes a lever mechanism connected between main piston 24 and the piston rod 42 of a snubbing cylinder generally indicated at 44, said snubbing cylinder having forward and rear chambers connected by a line having therein a metering valve 46 operative to permit flow of hydraulic fluid from the rear chamber to the forward chamber at a predetermined maximum rate, valve 46 being by-passed by check valve 48 to permit unimpeded return of fluid from the forward to the rear chamber. The lever mechanism itself includes a main piston link 50 pivotally connected to the short leg of a bell crank lever 52 pivoted on a fixed axis and the other leg of which constitutes one link of a toggle mechanism, the companion link 54 of which is pivotally connected to the snubbing cylinder piston rod 42. With such arrangement, forward movement of platen 16 as urged by fluid pressure in main cylinder 22 will be at a rate controlled by snubbing cylinder 44 until the toggle mechanism reaches dead center, after which time the snubbing cylinder no longer acts to impede the movement of platen 16, and then it will move forward at a rate determined solely by the fluid pressures in main cylinder 22. Thus, the forward speed of movement of platen 16 is controlled during the preheating and flash-off portion of the machine cycle to prevent the premature butting of the workpieces as hereinafter more fully explained. Although the means of Stieglitz U. S. Patent No. 2,492,200 is preferred for providing the essential controlled rate of forward movement of platen 16, it will be appreciated that other means known to the art may be used.

Suitable welding current is supplied to the welding machine by a welding transformer having one side of its secondary winding 56 connected to insulated fixed platen 14 and the other side connected to movable platen 16. The primary winding 58 of said transformer has one side thereof connected to one terminal 60 of a suitable source of alternating current, said terminal 60 also being connected to one side of a tapped autotransformer 57 having a tap switch 59. The welding transformer primary 58 is provided with taps at its other side, said taps being connected to a main heat switch 62 and a preheat switch 64, said preheat switch being selectively connected to the other terminal 61 of said power source through normally open preheat contacts 66–2 of a heat transfer relay having a coil 66, and through the normally open contacts 68–1 of a current initiation relay having a coil 68. The main heat switch 62 is selectively connected to said terminal 61 through either normally closed contacts 65–1 in series with autotransformer tap switch 59 or through normally open contacts 65–2 of post heat relay coil 65 shunting said tap switch, said autotransformer being connected through normally closed main heat contacts 66–1 of said heat transfer relay to said current initiation contacts 68–1. By the provision of separate preheat, main heat, and autotransformer switches, we are enabled to adjust the preheat current independently of the main welding current to provide optimum current in each case, as well as to adjust the post heat current independently of either.

In order automatically to control the operation of our novel welding machine by means of the voltage drop across the work being welded, we provide connected across the work holding blocks 15 and 17 the primary winding 72 of a control transformer, said primary winding preferably being tapped and having a tap switch 73. The secondary winding 74 of the control transformer is connected in series with normally closed contacts 90–2 of a lockout relay having a coil 90 and is connected to two opposed pairs of rectifying elements each in parallel therewith, one of said pairs comprising a pair of opposed rectifying elements 76 with their conducting directions away from one another and hence producing a negative potential at their junction, and the other of said pairs comprising a pair of opposed rectifying elements 78 with their conducting directions toward one another producing a positive potential at their junction. Each of said junctions is connected to an opposite end of the coil 80 of a sensitive direct relay having a pair of contacts 80–1, said relay having separate means for controlling its closing voltage (which is a function of the open circuit voltage across welding transformer secondary winding 56) and its drop-out voltage (which is a function of the "IR" drop between the workpieces 20 during welding current flow), as well as having suitable meters for indicating said voltages. The positive potential junction of rectifiers 78 is connected through relay contacts 113–4 to the positive side of sensitive D. C. relay coil 80, the other side of which is connected through an adjusting resistor 81 to the sliding arm of a voltage sensitivity control potentiometer 92, having one of its ends connected to the positive junction of rectifiers 78. The other end of potentiometer 92 is connected through relay contacts 114–1 and 114–9, one of which is arranged in parallel with variable resistor 94 by switch 128 to the negative potential junction of rectifiers 76. A voltage sensitivity indicating meter 96 is provided connected between the sliding arm of potentiometer 92 and the positive junction of rectifiers 78. Preferably, an overload relay having a coil 70 is also connected between the arm of potentiometer 92 and said positive junction, said coil 70 having in series therewith an adjusting resistor 98 and being provided with suitable contacts 70–1. The positive side of sensitive D. C. relay 80 is also connected through adjustable current sensitivity resistor 82 to the positive junction of rectifiers 78, said resistor 82 being shunted by normally closed relay contacts 113–4, and a current sensitivity indicating meter 102 is provided connected across said sensitive D. C. relay coil 80 in series with its adjusting resistor 81. Both of the meters 96 and 102 are preferably calibrated to facilitate setting the apparatus as hereinafter explained.

By the use of the above-described sensitive D. C. relay, together with its associated circuits for separate adjustment of its closing voltage and its drop-out voltage, the preheating cycling, as well as the automatic initiation of flashing, the hesitation, the current cutoff, and the post-heating, may be controlled by the voltage appearing across the welding machine work holding blocks 15 and 17 (which is a function of the voltage across the work itself) through suitable relay circuits including timing means to control the solenoid actuated hydraulic valves 34 and 40 which actuate the movable platen 16.

In order to operate said hydraulic valves, the relay circuits provided include, connected between voltage source input terminals 60 and 61, a normally open momentary contact start switch 104 in series with the coil 111 of a starting relay and with a normally closed momentary open stop switch 106. Normally open contacts 111–1 are provided to lock in said starting relay by shunting start switch 104, said relay having further contacts 111–2, 111–3 and 111–4 connected as follows: normally open contacts 111–2 are connected in series with the normally closed contacts 108–1 of the heat transfer timer hereinafter described and with the coil 114 of a relay having contacts 114–1 connected as above described, together with additional contacts to be described, to the terminal 107 of stop switch 106 opposite to the terminal connected to power source terminal 61; normally open contacts 111–3 are connected either to main heat contacts 66–1 through contacts 120–1 of a movable platen actuated double pole limit switch mounted on welder base 12 and a switch 119 in series with coil 118 of a current cutoff delay timer or to said stop switch terminal 107 both through a first path consisting of normally open contacts 120–1 of said movable platen actuated double pole limit switch mounted on welder base 12 and through the coil 110 of an unload timer having normally closed contacts 110–1, and through a second path consisting either of normally closed contacts 120–2 of said limit switch or switch 117 in series with contacts 118–1 of said current cutoff time delay relay and relay coil 116 having contacts 116–2 and 116–3; and normally closed contacts 111–4 are connected in series with the normally open contacts 113–3 of a hereinafter described preheat control relay between power terminal 60 and stop switch terminal 107.

The coil 112 of a post heat relay having normally open contacts 112–1, 112–2, and 112–3 is arranged in series with the normally open contacts of a movable platen actuated single pole switch 121, mounted on welder base 12, between power terminal 60 and stop switch terminal 107. Contacts 112–3 are in series with the coil 115 of another post heat relay, having normally closed contacts 115–1 and 115–2 arranged as hereinafter described, between power terminal 60 and stop switch terminal 107.

The coil 113 of the preheat control relay is arranged in series with the normally open contacts 80–1 of the sensitive D. C. relay and the normally closed contacts 115–1. Said contacts 80–1 and 115–1 are shunted by normally open contacts 112–1. Normally open contacts 112–2 are in series with contacts 80–1 and coil 65. The contacts 115–2 are connected between the junction of said contacts 112–2 and coil 65 and the junction of start switch 104 and coil 111. The side of coil 65 connected to said contacts 112–2 is also connected to the junction of switch contacts 120–2 and coil 116 through a single pole single throw switch 67, which enables coil 65 to be selectively controlled either by platen actuated contacts 120–2 or by D. C. relay contacts 80–1. The coil 113 is adapted, when current is passed therethrough to operate a plurality of contacts as follows: normally open contacts 113–1 are connected between power terminals 60 and 61 in series with starting relay contacts 111–1 and solenoid operated return hydraulic valve 40 to provide for operation of said valve to connect pipe 32 to exhaust; normally open contacts 113–2 are connected between power terminals 60 and 61 also in series with starting relay contacts 111–1 but also in series with normally closed contacts 109–1 and 110–1 of the preheat and unload timers, respectively, and with solenoid operated forward hydraulic valve 34 to operate said valve; normally open contacts 113–3 are connected on one side to power terminal 60 and on the other side to stop switch terminal 107 through coil 108 of the heat transfer timer in series with a parallel circuit consisting of normally closed contacts 111–4 and normally open contacts 100–1; normally closed contacts 113–4 are connected between the positive junction of rectifiers 78 and the junction of sensitive D. C. relay coil 80 as a shunt for current sensitive resistor 82; and finally, normally closed contacts 113–5 are connected between power terminal 60 and stop switch terminal 107 in series with contacts 114–2, 116–3, and coil 109 of the preheat timer.

The coil 114 of a preheat relay is arranged in series with contacts 111–2 and contacts 108–1 between power terminal 60 and stop switch terminal 107 as above described, and serves to actuate a number of contacts as follows: normally open contacts 114–1 are connected in series with normally closed contacts 114–9 to shunt adjustable resistor 94, one of said contacts 114–1 and 114–9 being selectively shorted by a single pole double throw switch 128 having low preheat contacts 128–1 for shorting out contacts 114–1 and high preheat contacts 128–2 to short out contacts 114–9, so that a preheat current either higher or lower than the main heat current may be used; contacts 114–2 are in series with contacts 113–5, 116–3, and coil 109, as above described; normally open contacts 114–3 are connected between power terminals 60 and 61 in series with coil 66 of the heat transfer relay, such having normally closed high heat terminals 66–1 and normally open low heat terminals 66–2 as above described; normally closed contacts 114–4 are in parallel with contacts 113–1; normally open contacts 114–5 are in parallel with contacts 113–2; normally open contacts 114–6 are in series with the solenoid return speed bypass valve 36 between power terminals 60 and 61, while normally open contact 114–7 is connected in series with preheat indicator light 126 between power terminals 60 and 61; and normally closed contacts 114–8 are in series with main heat indicator light 124 between terminal 60 and the junction of coil 68 and contacts 116–2.

The coil 116 of a relay is in series between power terminal 60 and stop switch terminal 107 with contacts 130 of a double pole momentary contact calibration switch, the other contacts 132 of which are arranged to shunt contacts 111–2. The junction of contacts 130 and coil 116 is also connected to contacts 111–3 through either the normally closed contacts 120–2 of an adjustable platen actuated double pole switch 120, or the normally closed contacts 118–1 in series with contacts 117–1 of switch 117, which when closed permits contacts 118–1 to shunt the normally closed platen actuated switch contacts 120–2. As above described, normally open contacts 116–3 are in series with contacts 113–5, 114–2, and preheat timer coil 109; normally open contacts 116–2 are in series with current initiation relay coil 68 between power terminals 60 and 61, said current initiation relay coil serving to actuate normally open contacts 68–1 which turn on the current to the welding transformer primary winding.

A still further control relay is provided having one side of its coil 100 connected to stop switch terminal 107 and its other in series with contacts 111–1 through a circuit consisting of contacts 113–2 and 114–5 in parallel which are in series with another circuit consisting of normally open contacts 109–2 controlled by preheat timer coil 109. Normally open contacts 100–2 shunt said timer contacts 109–2 to lock in said relay when the timer times out. Normally open contacts 100–1 of said relay shunt contacts 111–4.

The lockout relay coil 90 which actuates contacts 90–2 in the control transformer secondary circuit, as above described, is arranged in series between power terminals 60 and 61 with contacts 70–1 and a normally closed momentary reset switch 122, lock-in contacts 90–1 also being provided shunting said contacts 70–1 to lock in said relay. Preferably, an overload indicator light 125 is provided connected between the junction of coil 90 and contacts 90–1 and power terminal 61.

The timers provided are all of a type well known to the art in which the timer contacts are actuated a preset time after current has been passed through the timer coil, such timers being arranged for ready setting to a desired time interval. The heat transfer timer has its coil 108 connected at one side to stop switch terminal 107 and its other side connected to power terminal 60 either through its associated normally open contacts 108–2 and contacts 111–2 in series or through a circuit consisting of contacts 113–3 in series with contacts 111–4 and 100–1 in parallel, its other contacts 108–1 being in series with contacts 111–2 and coil 114 between terminal 60 and stop switch terminal 107.

The preheat timer has its coil 109 in series with contacts 113–5, 114–2, and 116–3, between power terminal 60 and stop switch terminal 107. Its normally open contacts 109–2 shunt contacts 100–2. Its normally closed contacts 109–1 are in series with unload timer contacts 110–1 and forward solenoid hydraulic valve 34 between the junction of contacts 113–2, 114–5, and 100–2, and the power terminal 61.

The unload timer has its coil 110 connected between power terminal 60 and stop switch terminal 107 in series with contacts 111–3 and platen actuated switch contacts 120–1 with its associated contacts 110–1 connected between preheat timer contacts 109–1 and forward valve 34 as above described. Preferably, an indicator light 127 is connected in parallel with forward valve 34 to indicate when the load is removed from movable platen 16.

The current cutoff delay timer has one side of its coil 118 connected in series with its switch contacts 117–2 to terminal 60 through platen actuated contacts 120–1 in series with contacts 111–3. The other side of said coil 118 is connected to terminal 61 through heat transfer contacts 66–1 and current initiation contacts 68–1, its single set of contacts 118–1 being connected as above described to shunt platen acuated switch 120–2.

In order to operate the above-described welding machine, it is first set up for the specific work to be welded. This is done by first setting the main heat tap switch 62 and the preheat tap switch 64 to a preferred setting. If the main heat current is set at a value higher than that of the preheat current, the preheat selector switch 128 is switched to its high terminals 128–2. This sets up the circuit so that the shunt is removed from resistor 94 simultaneously with the change from preheat to main heat, thus compensating for the increase in voltage upon such change. Under these conditions, the preheat is calibrated first. If, on the other hand, the main heat current is lower than the preheat, said switch 128 is switched to its low terminals 128–1 so that resistor 94 is shunted simultaneously with the change from preheat to main heat to compensate for the decrease in voltage. Under these conditions, the main heat is first calibrated.

With the more usual arrangement in which the main heat is higher than the preheat, the voltage sensitivity potentiometer 92 is set to minimum sensitivity (maximum resistance), the calibration switch pressed to connect its pairs of terminals 130 and 132, and the voltage sensitivity potentiometer 92 moved until the voltage sensitivity meter 96 indicates a reading which is about halfway between maximum and minimum sensitivity. During this operation the heat transfer timer is prevented from timing out by resetting it if necessary with the calibration switch. This setting will be found to be satisfactory for most work.

If the overload indicator 125 should light and the voltage sensitivity meter 96 fail to read, the voltage sensitivity control potentiometer 92 was set at too low a resistance setting which caused the overload relay coil 70 to pick up its contacts 70–1, energize the lock-out relay coil 90, and open contacts 90–2 to re-energize sensitive D. C. relay coil 80. To correct this condition, it is necessary to open the calibration switch contacts 130 and 132 and press reset switch 122. The voltage sensitivity control potentiometer 92 may then be reset.

Next, with the calibration switch still closed, the current sensitivity control potentiometer 82 is set to indicate a reading on the current sensitivity meter 102 of about 0.6 to 0.8 of maximum. The calibration switch contacts 130 and 132 can then be opened. With the calibration switch closed, the heat transfer timer is allowed to time out and the main heat sensitivity is adjusted until meters 96 and 102 maintain their settings when the heat transfer timer transfers from preheat to main heat. The return speed is adjusted by means of valve 38 to provide a desired return travel distance.

The heat transfer delay timer is then set by closing calibration contacts 130 and 132 and observing the time between the lighting of the preheat current indicator 126 and the main heat indicator 124, and then adjusting it so the delay time is approximately ⅓ of the desired flashing time. The preheat timer should then be set to the desired preheating time. At the same time, the post heat timer, if used, may be set to a desired post heating time, and the delay of current cutoff may be adjusted by means of the position of platen actuated switch 120. The platen unloading control timer is then set to control the unload time delay. With the preheat at a higher value than the main heat, a similar procedure may be followed with the main heat being calibrated first.

It will be understood that the above-described setup procedure is only necessary on a new job, as once the settings for any given job have been determined, it will only be necessary to set the respective timers back to the same dial settings at any time it is desired to repeat the same setup.

To describe briefly the operation of our invention, when the welder is started by pressing starting switch 104, the movable platen 16 is brought forward at a controlled (slow) speed by the platen control mechanism as above described, and the preheat current is turned on by the control circuit usually at a reduced value determined by the setting of the preheat tap switch 64. The application of power to the welding transformer causes the sensitive relay coil 80 to close its contacts 80–1 by the application of the open circuit voltage of welding transformer secondary winding 56 thereto, since the movable platen has not closed the preset gap between the workpieces 20. The contacts 80–1 energize the coil 113 and through the above-described associated circuits reduce the coil 80 hold-in voltage to the preset value as determined by the current sensitivity control potentiometer 82. During the initial forward movement of the platen, the heat transfer timer is rendered inoperative to prevent premature transfer to main heat, as caused by, for example, workpieces having irregular end surfaces, variations in initial work gap, or the like. This feature we have found to be important since it minimizes the need for accuracy in work preparation.

When the movable platen 16 closes the work gap, the workpieces 20 butt and preheat current starts to flow. The resultant voltage drop across the welding dies reduces the voltage on the relay coil 80 to a point below its minimum hold-in voltage, causing it to drop out its contacts 80–1 and to de-energize the platen return solenoid valve 40, applying bucking force to the movable platen 16 and reducing the preheat force to any desired value as determined by the fluid pressure system. Control of preheat force is important to prevent upsetting the workpieces during preheating, and this is particularly important with alloys which have low strength at elevated temperatures, such as non-ferrous materials. Even with ferrous alloys, it greatly reduces danger of premature welding during preheat. The butting of the workpieces and the subsequent de-energization of the sensitive D. C. relay coil 80 initiates the preheat timer which controls the length of the preheating time. It is particularly noted that as the preheat timer receives its initiation simultaneously with the actual start of the heating, a precise control of heat time is readily maintained.

The timing out of the preheat timer actuates its contacts 109–1 and 109–2; contacts 109–1 de-energize the solenoid valve 34 controlling the forward pressure on the movable platen 16. Contact 109–2 energizes relay 109 which locks itself in providing for operation of the heat transfer timer. This allows the return, or bucking force, which is still maintained to start to return the platen and thus break or gap the work. The gapping of the work allows the voltage across transformer secondary 56 to rise and re-energize the coil 80 of the D. C. relay circuit. The re-energization of the relay through its contacts 80–1 re-initiates forward solenoid 34, removes the bucking pressure from the platen, and initiates the heat transfer timer.

As the platen again moves forward at its relatively slow speed and closes the work gap, flashing is initiated when the workpieces 20 touch if sufficient temperature was generated in the work during the first preheat bump. It should be noted that when this temperature is reached the abutting ends of the workpieces will burn or flash off at the same rate as the controlled forward movement of the platen and thus, since solid contact cannot be maintained, flashing is initiated. However, if the work temperature is not sufficient to initiate flashing, the work will butt and the cycle be repeated. Thus the workpieces 20 having reached the proper temperature and flashing initiated to begin the welding portion of the machine cycle, the "IR" drop across the work gap due to the flashing current is not sufficient to reduce the current in coil 80 sufficiently to drop out the contacts 80–1. Thus the heat transfer timer remains initiated, and after a preset delay, it times out and locks itself in by its contacts 108–2 and de-energizes relay 114, cutting out the preheat circuit and shifting the welding current to main heat. The machine now proceeds through the flashing cycle and preferably about 1/8" before upset, the movable platen engages switch 121 energizing relay coil 112 which in turn energizes relay coil 115 to energize post heat relay coil 65 and current cutoff delay timer coil 118 if used, and if not, operating to short contacts 80–1 of the current sensitive relay to prevent its operation during upset.

However, if at any time during the flashing cycle between the operation of the heat transfer timer and the operation of the lock-out limit switch 120, the work should tend to stall, or butt, and lose flashing, the current sensitive relay coil 80 will drop out its contacts 80–1 as previously described. However, due to the de-energization of the heat transfer relay coil 114 by the then locked in heat transfer timer, the relay circuit instead of going through another preheating cycle merely stops the movable platen forward motion by de-energizing the forward solenoid valve 34, until the welding current, which remains at main heat, blows the work clear, at which time the rise in secondary voltage re-energizes the relay circuit and flashing is resumed without any backward or lost motion in the platen.

The upset force is automatically provided at the completion of the flashing motion of movable platen 16 by its associated fluid driving and snubbing mechanism as above described. At a predetermined point during upset movable platen 16 engages adjustable limit switch 120 and, assuming current cutoff time delay switch 117 open, cuts the welding current directly. However, if further delay in current cutoff is desired, it may be obtained by closing switch 117, and current cutoff then becomes a function of the current cutoff time delay timer. Limit switch 120 also initiates platen unload timer 110 which, upon timing out, in turn connects the forward solenoid valve 34 to exhaust, the return solenoid valve 40 having been previously connected to exhaust.

If the workpieces are to be post heated after welding, the current cutoff delay timer is used by closing switch 117, so that the work may be post heated after welding at a reduced current for a predetermined time according to the adjustment of said timer, after which time the current is cut off and the unload timer initiated. After removing the work, the platen is returned to start position by operating the stop button 106, thus de-energizing all circuits.

The following sequence of operation of our novel welder explains in detail all of its functions: preheat, flash, hesitation, upset, main current cutoff, postheat, and platen unload. This sequence assumes the welder to be set up for welding with the work properly gapped and clamped in the machine and with the various time delays and the preheat control at desired settings, all as explained above, and with all elements in their normal positions as shown on the drawing.

Pressing start switch 104 passes current through starting relay coil 111 since stop switch 106 remains closed. The contacts associated with said coil 111 are then operated as follows: contacts 111–1 (n. o.) close to lock in all contacts of coil 111 by permitting current flow through said coil when starting switch 104 is released to its normally open position, and also energize return solenoid valve 40 through normally closed contacts 114–4 (which is almost immediately de-energized by opening of 114–4); contacts 111–2 (n. o.) close to energize coil 114 through the normally closed contacts 108–1 of the heat transfer timer; contacts 111–3 (n. o.) energize coil 116 through normally closed movable platen limit switch contacts 120–2; and contacts 111–4 (n. c.) open removing the shunt circuit from contacts 100–1 so that the heat transfer timer cannot be energized until the preheat timer has been through its cycle for the first time.

Post heat relay coil 65 is also energized by contacts 111–1 through normally closed contacts 115–2, thus closing normally open contacts 65–2 to by-pass the autotransformer 57 at this stage of the machine cycle.

Coil 114, having been energized by contacts 111–2, operates its contacts to perform functions as follows: assuming that preheat selector switch 128 is switched to its high contacts 128–2, contacts 114–1 (n. o.) close to shunt variable resistor 94 out of the circuit until later when it compensates for increased voltage due to the shift to the main welding current, (if switch 128 be in its other position, contacts 114–9 open to put said resistor in the circuit, it being shunted out later when the shift to main current takes place); contacts 114–2 (n. o.) close to set up the preheat timer; contacts 114–3 (n. o.) close to energize heat transfer relay coil 66 which by its contacts 66–2 (n. o.) puts the welder on preheat with the high heat contacts 66–1 (n. c.) open; contacts 114–4 (n. c.) open shifting control of the return solenoid valve 40 to contacts 113–1; contacts 114–5 (n. o.) close and shunt out contacts 113–2 and in so doing energize forward solenoid valve 34 through contacts 109–1 (n. c.) and 110–1 (n. c.) to supply fluid under pressure to forward chamber 26 to move the platen forward; contacts 114–6 (n. o.) close and shut the return speed by pass valve 36; contacts 114–7 close to light the preheat indicator 126; and contacts 114–8 open to hold off the main heat indicator light 126.

Coil 116 having been energized by contacts 111–3, operates its contacts to perform functions as follows: contacts 116–2 (n. o.) turn on the preheat welding current by means of coil 68 and its contacts 68–1; and contacts 116–3 (n. o.) set up the preheat timer through contacts 113–5, and the already closed contacts 114–2.

Upon initiation of flow of current, a voltage appears across the control transformer primary winding 72. The control transformer raises the voltage to a higher value as determined by the setting of its primary tapswitch 73 and through rectifiers 76 and 78 in series with contacts 90–2 energizes D. C. relay coil 80 through the voltage sensitivity control potentiometer 92 and contacts 113–4 (n. c.). Due to the setting of control potentiometer 92 during the above-described calibration, the voltage is not sufficient for coil 70 to pick up its contacts 70–1 and open contacts 90–2 (n. c.) by passing current through coil 90.

Thus, the sensitive D. C. relay coil 80 closes its contacts 80–1 to energize coil 113 through normally closed contacts 115–1, the contacts of which coil function as follows: contacts 113–1 (n. o.) close to energize the return solenoid valve 40 exhausting the platen return pressure on the chamber 28; contacts 113–2 (n. o.) close but being shunted by contacts 114–5 are non-functional at this stage; contacts 113–3 (n. o.) also close; contacts 113–4 (n. c.) open and reduce the hold-in voltage on coil 80 to the preset value determined by the setting of the current sensitivity potentiometer 82 during calibration and contacts 113–5 (n. c.) open to hold off the preheat timer.

The movable platen 16 is now moving to close the gap between the workpieces 20 at a predetermined speed as determined by the snubbing cylinder 22 and its mechanism. The butting of the workpieces 20 taking place at the full forward force ensures firm pressure contact between the workpieces and allows preheat current to pass through the work and the resultant voltage drop across the dies causes coil 80 to drop out its contacts 80–1, thus de-energizing coil 113 and operating its contacts as follows: contacts 113–1 (n. o.) open to de-energize the return solenoid valve 40 and put a predetermined bucking force on the platen, thus reducing the platen force to a predetermined value less than that of the full forward force as is desirable for preheating; contacts 113–2 (n. o.) open but are by-passed by contacts 114–5; contacts 113–3 (n. o.) open; contacts 113–4 (n. c.) close to by-pass the current sensitivity control; and contacts 113–5 (n. o.) close to start the preheat timer.

The work now remains butted and continues to heat under low pressure until the preheat timer times out. When this happens, its contacts operate as follows: contacts 109–1 (n. c.) open and de-energize the forward solenoid valve 34, exhausting the forward pressure on the movable platen 16 and allowing the bucking force in chamber 28 to move the platen rearwardly and gap the workpieces 20, the rate of such rearward movement being controlled by throttle valve 38 because return speed by pass valve 36 is closed; contacts 109–2 (n. o.) of the preheat timer also close to energize coil 100, which through its contacts 100–2 remains locked in after the preheat timer times out for the first time; contacts 100–1 serve then to shunt contacts 111–4 setting up the heat transfer timer for operation.

The gapping of the work causes an instantaneous rise in the welding transformer secondary voltage, thus re-energizing coil 80 to close its contacts 80–1. This in turn re-energizes coil 113 to start the heat transfer timer through contacts 113–3 and 100–1, reset the preheat timer and start the platen forward again as above described. The platen then again closes the work gap, and if the work has been sufficiently preheated, it will pick up flashing. However, if it is not hot enough it will again butt, dropping out contacts 80–1 as before, and repeating the preheating and gapping cycle as many times as necessary until the work is hot enough to pick up flashing. Since during flashing the "IR" drop across the dies is not enough to reduce the current through coil 80 to drop out its contacts 80–1, the platen continues with its forward motion and the machine proceeds with the flashing portion of the weld cycle.

As the flashing proceeds, the heat transfer timer times out, operating its contacts as follows: contacts 108–2 (n. o.) lock in said timer by shunting contacts 113–3; contacts 108–1 (n. c.) open and de-energize coil 114. Coil 114 then operates its contacts to function as follows: assuming switch 128 in its high position 128–2, contacts 114–1 open and put main heat sensitivity resistor 94 in the circuit to compensate for change in voltage due to the shift to main heat (with switch 128 in its low position 128–1, contacts 114–9 open to put resistor 94 in circuit to compensate for said voltage); contacts 114–2 (n. o.) open to lock out the preheat timer; contacts 114–3 open to de-energize the heat transfer relay coil 66 and close its contacts 66–1, thus shifting to main heat; contacts 114–4 (n. c.) close to lock in platen return solenoid valve 40 by shunting contacts 113–1 thus maintaining said valve connected to exhaust; contacts 114–5 (n. o.) open to setup contacts 113–2; contacts 114–6 (n. o.) open to de-energize the return speed solenoid valve 36 to open pipe 35 directly to exhaust; contacts 114–7 open to extinguish preheat indicator 126; and contacts 114–8 (n. c.) close to light main heat indicator 124.

The above sequence sets up the platen hesitation function of the circuit so that if the workpieces 20 should start to stall or butt, due to a minor discrepancy in the weld setting dropping out contacts 80–1, the following sequence will be initiated instead of the preheat cycle repeating itself. Upon contacts 80–1 (n. o.) opening to de-energize coil 113, the contacts operated by said coil function as follows: contacts 113–1 (n. o.) open but are by-passed by contacts 114–4 so that the platen bucking pressure will not be applied; contacts 113–2 (n. o.) open to de-energize forward solenoid valve 34, thus removing the force urging movable platen 16 forward; contacts 113–3 (n. o.) open but are by-passed by contacts 108–2 which hold the heat transfer timer locked in and so maintain full heat; contacts 113–4 (n. c.) close to by-pass the current sensitivity control potentiometer 82; and contacts 113–5 (n. c.) close, but are rendered non-functional by contacts 114–2.

Thus, with the platen having lost its forward force, the work will blow itself clear as full heat is maintained. When the work has thus cleared itself, the resultant rise in secondary voltage re-energizes coil 80 and the flashing cycle will then proceed. When the workpieces 20 during flashing have reached a point about ⅛" before upset, movable platen 16 engages limit switch 121, the contacts 121–1 of which energize relay coil 112, the contacts of which operate as follows: contacts 112–1 (n. o.) close to shunt contacts 115–1 (n. c.) and contacts 80–1; contacts 112–2 (n. o.) close to shunt contacts 115–2 (n. c.) and establish the circuit from contacts 80–1 to post heat relay coil 65, and contacts 112–3 energize coil 115. Coil 115 operates its contacts as follows; contacts 115–1 (n. c.) open to open the circuit from contacts 80–1 to coil 113 and contacts 115–2 (n. c.) open so that post heat relay coil 65 is controlled by contacts 80–1, assuming that switch 67 be open (closing switch 67 shifts control of said relay coil 65 from said contacts 80–1 to the adjustable platen actuated switch contacts 120–2). Thus, further operation of the platen hesitation circuit is prevented, and when the workpieces butt during upset, causing coil 80 to drop out its contacts 80–1, post heat relay coil 65 is de-energized, shifting the current from a main heat current to a post heat current suitably reduced according to the setting of auto-transformer tap switch 59.

As the above-described toggle mechanism passes through center, the upset portion of the weld cycle is initiated, the upset force being determined by the push-up pressure setting. At a predetermined point during such upset, the movable platen 16 engages the current cut-out limit switch 120, the contacts of which then operate as follows: contacts 120–1 (n. o.) close to initiate the unload timer; assuming that current cutoff delay timer switch 117 be open, contacts 120–2 open immediately to de-energize coil 116, whereas if said switch be closed the post heat time may be extended by the setting of the current cutoff delay timer, the contacts 118–1 (n. c.) of which open after a predetermined time to de-energize said coil 116. The contacts of coil 116 then operate as follows: contacts 116–2 (n. o.) open to terminate current flow and turn off main heat indicator 124 and contacts 116–3 (n. o.) are already locked out by contacts 114–2.

The platen unload timer is set to allow sufficient time for the upset and post heating (if any) to be completed, and upon timing out by its contacts 110–1 (n. c.) de-energizes forward solenoid valve 34 to remove all force from the platen by opening the cylinder to exhaust. The platen load indicator 127 in parallel with said valve 34 is also extinguished to indicate the removal of all force from the platen and signal the completion of the weld cycle so that the clamps 18 may be opened. After opening the clamps, the platen may be returned by pressing the stop button 106 which returns the platen and resets all circuits.

Figure 2:
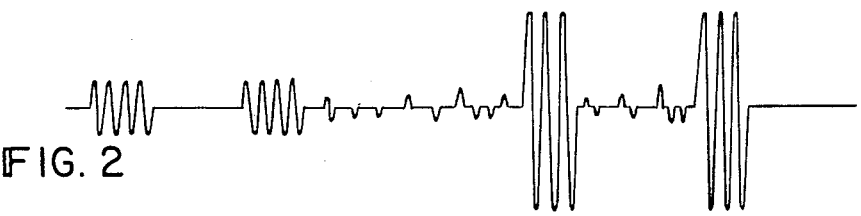
Figs. 2 through 5 are current diagrams illustrating the operation of the machine of Fig. 1.
Figure 3:
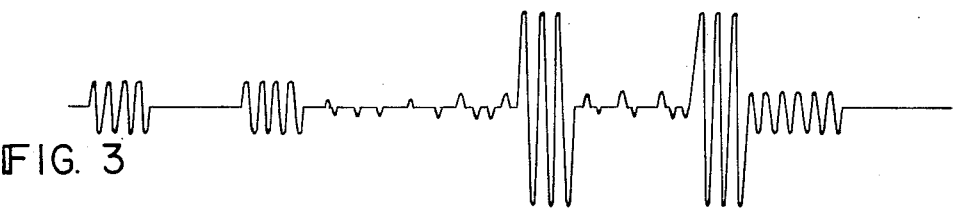
Figure 4:
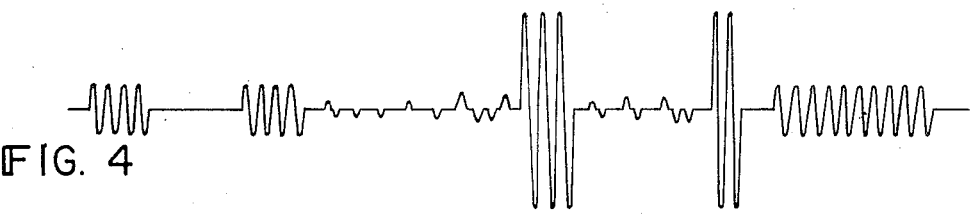
Figure 5:
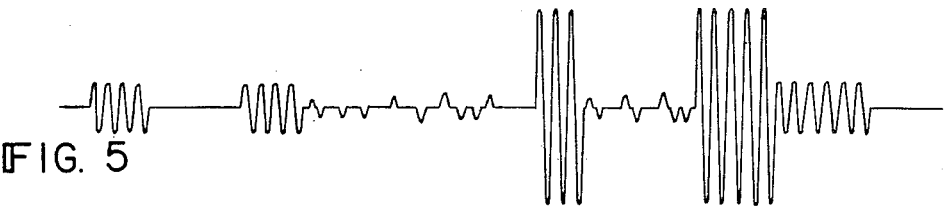

In Figs. 2 through 5 are shown current diagrams which clearly show the various above-described functions of our novel welding machine. Fig. 2, for example, shows a complete welding cycle including two preheating bumps, flashing, premature butting, hesitation, continued flashing, welding butting, and current cutoff by means of the platen actuated switch 120, switch 67 being closed and switch 117 being open. Fig. 3 is similar except that both switches 67 and 117 are open so that the welding current is reduced by relay coil 80 to a lower post heat current, said post heat current being cut off by platen actuated switch 120. Fig. 4 is similar to Fig. 3 except that switch 117 is closed so that the time of post heat current cutoff is controlled by the post heat timer; under these conditions the platen actuated switch 120 is preferably set at the time of upset. Fig. 5 differs from the above-described figures in that the main heat time after butting is controlled by closing switches 67 and 117, and the welding current is reduced to a post heat current value by adjustable platen actuated switch 120 and finally cut off by the post heat timer.

Thus it will be seen that we have provided a novel automatic preheating and post-heating flash welder. It will be apparent to those skilled in the welding art that the current values through the workpieces, which are in effect equivalent to and derived from the voltage drop thereacross, may be used in the practice of our invention. Various other modifications of our novel welder may be also made within the spirit of our invention and the scope of the appended claims.

We claim:

1. A flash-butt-welding machine including relatively movable platen means for supporting workpieces to be welded, reversible fluid motor means for moving said platen means toward and away from one another at a substantially constant pressure in accordance with the fluid pressure supplied thereto, a snubbing device, a toggle mechanism connected between said snubbing device and said platen means for cooperating with said snubbing device to resist the relative motion of said platen means induced by said motor means during the first portion of the movement of said platen means toward one another and thereafter to permit said motor to complete said movement of said platen means toward one another substantially unresisted by said snubbing device, valve means effective to vary the direction of travel of said motor means, and control means responsive to voltage across said workpieces, said control means being connected and arranged to operate said valve means to preheat said workpieces by butting said workpieces and then moving said platen means away from one another to gap said workpieces, and finally to weld said workpieces by moving said platen means toward one another.

2. A flash-butt-welding machine including relatively movable platen means for supporting workpieces to be welded, current switch means effective to vary the current through said workpieces, reversible fluid motor means for moving said platen means toward and away from one another at a substantially constant pressure in accordance with the fluid pressure supplied thereto, a snubbing device, a toggle mechanism connected between said snubbing device and said platen means for cooperating with said snubbing device to resist the relative motion of said platen means induced by said motor means during the first portion of the movement of said platen means toward one another and thereafter to permit said motor to complete said movement of said platen means toward one another substantially unresisted by said snubbing device, valve means effective to vary the direction of travel of said motor means, and control means responsive to voltage across said workpieces, said control means being connected and arranged to operate said current switch means and said valve means to preheat said workpieces by butting said workpieces at a first current and then moving said platen means away from one another to gap said workpieces, and finally to weld said workpieces by moving said platen means toward one another at a second current.

3. A flash-butt-welding machine including relatively movable platen means for supporting workpieces to be welded, reversible fluid motor means for moving said platen means toward and away from one another, valve means effective to vary the direction of travel of said motor means, and control means responsive to voltage across said workpieces, said control means being connected and arranged to operate said valve means to preheat said workpieces by butting said workpieces and then moving said platen means away from one another to gap said workpieces, and finally to weld said workpieces by moving said platen means toward one another, said control means including relay means effective to actuate said valve means at a predetermined drop out voltage to reverse said motor, and means for adjusting the voltage supplied to said relay means by said voltage across said workpieces.

4. A flash-butt-welding machine as claimed in claim 3, in which said adjusting means includes means for independently adjusting the closing voltage and the drop out voltage of said relay.

5. A flash-butt-welding machine including relatively movable platen means for supporting workpieces to be welded, reversible fluid motor means for moving said platen means toward and away from one another, valve means effective to vary the direction of travel of said motor means, and control means responsive to voltage across said workpieces, said control means being connected and arranged to operate said valve means to preheat said workpieces by butting said workpieces and then moving said platen means away from one another to gap said workpieces, and finally to weld said workpieces by moving said platen means toward one another, said control means including relay means effective to actuate said valve means to reverse said motor and gap said workpieces to prevent welding thereof until after initially butting said workpieces and then moving said platen means away from one another.

6. A flash-butt-welding machine including relatively movable platen means for supporting workpieces to be welded, current switch means effective to vary the current through said workpieces, reversible fluid motor means for moving said platen means toward and away from one another, valve means effective to vary the direction of travel of said motor means, and control means responsive to voltage across said workpieces, said control means being connected and arranged to operate said current switch means and said valve means to preheat said workpieces by butting said workpieces at a first current and then moving said platen means away from one another to gap said workpieces, and finally to weld said workpieces by moving said platen means toward one another at a second current, said control means including relay means effective to actuate said current switch means and said valve means at a predetermined drop out voltage to vary the current through said workpieces and to reverse said motor, and means for adjusting the voltage supplied to said relay means by said voltage across said workpieces.

7. A flash-butt-welding machine including relatively movable platen means for supporting workpieces to be welded, current switch means effective to vary the current through said workpieces, reversible fluid motor means for moving said platen means toward and away from one another, valve means effective to vary the direction of travel of said motor means, and control means responsive to voltage across said workpieces, said control means being connected and arranged to operate said current switch means and said valve means to preheat said workpieces by butting said workpieces at a first current and then moving said platen means away from one another to gap said workpieces, and finally to weld said workpieces by moving said platen means toward one another at a second current, said control means including relay means effective to actuate said valve means to reverse said motor and gap said workpieces to prevent welding thereof at said second current until after initially butting said workpieces at said first current and then moving said platen means away from one another.

8. A flash-butt-welding machine including relatively movable platen means for supporting workpieces to be welded, current switch means effective to vary the current through said workpieces, reversible fluid motor means for moving said platen means toward and away from one another, valve means effective to vary the direction of travel of said motor means, and control means responsive to voltage across said workpieces, said control means being connected and arranged to operate said current switch means and said valve means to preheat said workpieces by butting said workpieces at a first current and then moving said platen means away from one another to gap said workpieces, and finally to weld said workpieces by moving said platen means toward one another at a second current, said control means including timing means actuated by the voltage across said workpieces said timing means being connected and arranged to actuate said current switch means to vary said current at a predetermined time during the movement of said platen means toward one another to weld said workpieces.

9. A flash-butt-welding machine including relatively movable platen means for supporting workpieces to be welded, current switch means effective to vary the current through said workpieces, reversible fluid motor means for moving said platen means toward and away from one another, valve means effective to vary the direction of travel of said motor means, and control means responsive to voltage across said workpieces, said control means being connected and arranged to operate said current switch means and said valve means to preheat said workpieces by butting said workpieces at a first current and then moving said platen means away from one another to gap said workpieces, and finally to weld said workpieces by moving said platen means toward one another at a second current, said control means including relay means actuated by the gapping of said workpieces and timing means actuated by said relay means connected and arranged to actuate said current switch means to vary said current at a predetermined time after said gapping during the moving of said platen means toward one another to weld said workpieces.

10. A flash-butt-welding machine as claimed in claim 9 wherein said timing means is adjustable to vary said predetermined time.

11. A flash-butt-welding machine including relatively movable platen means for supporting workpieces to be welded, reversible fluid motor means for moving said platen means toward and away from one another, valve means effective to vary the direction of travel of said motor means, and control means responsive to voltage across said workpieces, said control means being connected and arranged to operate said valve means to preheat said workpieces by butting said workpieces for a predetermined time and then moving said platen means away from one another to gap said workpieces, and finally to weld said workpieces by moving said platen means toward one another.

12. A flash-butt-welding machine as claimed in claim 11 in which said reversible fluid motor means includes means for controlling the rate of advance thereof to provide a predetermined rate of advance during flashing and then to effect accelerated motion thereof to upset said workpieces.

13. A flash-butt-welding machine as claimed in claim 11 in which said control means includes adjustable predetermined preheat timing means initiated by the butting of said workpieces.

14. A flash-butt-welding machine including relatively movable platen means for supporting workpieces to be welded, reversible fluid motor means for moving said platen means toward and away from one another, valve means effective to vary the direction of travel of said motor means, and control means responsive to voltage across said workpieces, said control means being connected and arranged to operate said valve means to preheat said workpieces by butting said workpieces for a predetermined time and then moving said platen means away from one another to gap said workpieces, and finally to weld said workpieces by moving said platen means toward one another, said control means including relay means actuated by the butting of said workpieces and timing means actuated by said relay means effective to actuate said valve means after said predetermined time to reverse said motor.

15. A flash-butt-welding machine including relatively movable platen means for supporting workpieces to be welded, reversible fluid motor means for moving said platen means toward and away from one another, valve means effective to vary the direction of travel of said motor means, and control means responsive to voltage across said workpieces, said control means being connected and arranged to operate said valve means to preheat said workpieces by butting said workpieces for a predetermined time and then moving said platen means away from one another to gap said workpieces, and finally to weld said workpieces by moving said platen means toward one another, said control means including timing means actuated by the butting of said workpieces effective to actuate said valve means after said predetermined time to reverse said motor and gap said workpieces to prevent welding until after initially butting said workpieces and then moving said platen means away from one another.

16. A flash-butt-welding machine including relatively movable platen means for supporting workpieces to be welded, current switch means effective to vary the current through said workpieces, reversible fluid motor means for moving said platen means toward and away from one another, valve means effective to vary the direction of travel of said motor means, and control means responsive to voltage across said workpieces, said control means being connected and arranged to operate said current switch means and said valve means to preheat said workpieces by butting said workpieces at a first current for a predetermined time and then moving said platen means away from one another to gap said workpieces, and finally to weld said workpieces by moving said platen means toward one another at a second current, said control means including timing means actuated by the butting of said workpieces effective to actuate said valve means after said predetermined time to reverse said motor and gap said workpieces and further timing means effective to actuate said current switch means at a predetermined time after said gapping during the movement of said platen means toward one another to weld said workpieces.

17. A flash-butt-welding machine including relatively movable platen means for supporting workpieces to be welded, reversible fluid motor means for moving said platen means toward and away from one another, valve means effective to vary the pressure and direction of travel of said motor means, and control means responsive to voltage across said workpieces, said control means being connected and arranged to operate said valve means to preheat said workpieces by butting said workpieces at a first pressure and then moving said platen means away from one another to gap said workpieces, and finally to weld said workpieces by moving them together at a second pressure.

18. A flash-butt-welding machine as claimed in claim 17 in which said reversible fluid motor means includes means for controlling the rate of advance thereof at said second pressure to provide during said welding a predetermined rate of advance during flashing and then to effect accelerated motion thereof to upset said workpieces.

19. A flash-butt-welding machine as claimed in claim 17 in which said valve means includes adjustable means effective to vary the fluid pressure on said motor during its forward drive to provide a first pressure during said preheating butting of said workpieces and a second pressure during welding of said workpieces.

20. A flash-butt-welding machine as claimed in claim 19 in which said control means is effective to actuate said valve means to provide said first pressure during preheating butting of said workpieces and said second pressure during welding of said workpieces.

21. A flash-butt-welding machine as claimed in claim 20 in which said valve means further includes means to vary the speed of said motor during its rearward drive.

22. A flash-butt-welding machine including relatively movable platen means for supporting workpieces to be welded, reversible fluid motor means for moving said platen means toward and away from one another, valve means effective to vary the pressure and direction of travel of said motor means, and control means responsive to voltage across said workpieces, said control means being connected and arranged to operate said valve means to preheat said workpieces by butting said workpieces at a first pressure, reducing said first pressure to a second pressure while maintaining said workpieces in butted position and then moving said platen means away from one another to gap said workpieces, and finally to weld said workpieces by moving them together at said first pressure.

23. A flash-butt-welding machine including relatively movable platen means for supporting workpieces to be welded, reversible fluid motor means for moving said platen means toward and away from one another, valve means effective to vary the pressure and direction of travel of said motor means, and control means responsive to voltage across said workpieces, said control means being connected and arranged to operate said valve means to preheat said workpieces by butting said workpieces at a first pressure for a predetermined time and then moving said platen means away from one another to gap said workpieces, and finally to weld said workpieces by moving said platen means toward one another at a second pressure.

24. A flash-butt-welding machine including relatively movable platen means for supporting workpieces to be welded, current switch means effective to vary the current through said workpieces, reversible fluid motor means for moving said platen means toward and away from one another, valve means effective to vary the pressure and direction of travel of said motor means, and control means responsive to voltage across said workpieces, said control means being connected and arranged to operate said current switch means and said valve means to preheat said workpieces by butting said workpieces at a first current and a first pressure for a predetermined time and then moving said platen means away from one another to gap said workpieces, and finally to weld said workpieces by moving said platen means toward one another at a second current and a second pressure, said control means including timing means actuated by the butting of said workpieces effective to actuate said valve means after said predetermined time to reverse said motor and gap said workpieces and further timing means effective to actuate said current switch means at a predetermined time after said gapping during the movement of said platen means toward one another to weld said workpieces.

25. A flash-butt-welding machine including relatively movable platen means for supporting workpieces to be welded, reversible fluid motor means for moving said platen means toward and away from one another, valve means effective to vary the direction of travel of said motor means, and control means responsive to voltage across said workpieces, said control means being connected and arranged to operate said valve means to preheat said workpieces by butting said workpieces and then moving said platen means away from one another, and finally to weld said workpieces by moving said platen means toward one another, said control means including relay means effective to actuate said valve means to arrest movement of said platens during welding movement to prevent premature butting of said workpieces.

26. A flash-butt-welding machine as claimed in claim 25 wherein said valve means includes means effective to vary the fluid pressure on said motor during its forward drive to provide a first pressure during said preheating butting of said workpieces, and a second pressure during welding of said workpieces and means for removing said second pressure to arrest the movement of said workpieces, and wherein said control means is effective to actuate said valve means to provide said first pressure during said preheating butting, and said second pressure during welding of said workpieces and to actuate said means for removing said second pressure to arrest the movement of said workpieces during flashing to prevent premature butting thereof.

27. A flash-butt-welding machine including relatively movable platen means for supporting workpieces to be welded, current switch means effective to vary the current through said workpieces, fluid motor means for moving said platen means toward one another, and control means responsive to voltage across said workpieces upon welding butting of said workpieces to reduce the upset current to a predetermined value.

28. A flash-butt-welding machine including relatively movable platen means for supporting workpieces to be welded, current switch means effective to vary the current through said workpieces, fluid motor means for moving said platen means toward one another, and control means responsive to voltage across said workpieces upon welding butting of said workpieces for controlling said current switch means to provide a high current for a predetermined time, and then post heat said workpieces at a reduced current.

29. A flash-butt-welding machine as claimed in claim 28 wherein said control means includes timing means actuated by the butting of said workpieces upon welding thereof to actuate said current switch means at a predetermined time after said butting to reduce said current.

30. A flash-butt-welding machine as claimed in claim 29 wherein said timing means is adjustable to vary said predetermined time.

31. A flash-butt-welding machine including relatively movable platen means for supporting workpieces to be welded, current switch means effective to vary the current through said workpieces, reversible fluid motor means for moving said platen means toward and away from one another, valve means effective to vary the direction of travel of said motor means, and control means responsive to voltage across said workpieces, said control means being connected and arranged to operate said current switch means and said valve means to preheat said workpieces by butting said workpieces at a first current and then moving said platen means away from one another to gap said workpieces, then to weld said workpieces by moving them together at a second current, and finally to post heat said workpieces at a current reduced from said welding current.

32. A flash-butt-welding machine including relatively movable platen means for supporting workpieces to be welded, current switch means effective to vary the current through said workpieces, reversible fluid motor means for moving said platen means toward and away from one another, valve means effective to vary the direction of travel of said motor means, and control means responsive to voltage across said workpieces, said control means being connected and arranged to operate said current switch means and said valve means to preheat said workpieces by butting said workpieces at a first current for a predetermined time and then moving said platen means away from one another to gap said workpieces, then to weld said workpieces by moving them together at a second current, and finally to post heat said workpieces at a current reduced from said welding current.

33. A flash-butt-welder as claimed in claim 32 wherein said control means includes a first timing means actuated by the preheating butting of said workpieces effective to actuate said valve means after said predetermined time to reverse said motor and gap said workpieces, a second timing means actuated by the gapping of said workpieces effective to actuate said current switch means at a predetermined time after said gapping during the movement of said platen means toward one another to weld said workpieces, and a third timing means actuated by the butting of said workpieces upon welding thereof to actuate said current switch means at a predetermined time after said butting to reduce said current.

References Cited in the file of this patent

UNITED STATES PATENTS

| | | |
|---|---|---|
| 2,085,049 | Spire | June 29, 1937 |
| 2,399,453 | Sinclair | Apr. 30, 1946 |
| 2,404,620 | Cooper | July 23, 1946 |
| 2,488,899 | Cooper et al. | Nov. 22, 1949 |
| 2,492,200 | Stieglitz et al. | Dec. 27, 1949 |

FOREIGN PATENTS

| | | |
|---|---|---|
| 475,238 | Great Britain | Nov. 16, 1937 |